United States Patent
Ruttenbur

(10) Patent No.: US 9,769,633 B2
(45) Date of Patent: *Sep. 19, 2017

(54) MESSAGING SERVICE APPLICATION PROGRAMMING INTERFACE

(71) Applicant: Zeta Interactive Corp., New York, NY (US)

(72) Inventor: Eric P. Ruttenbur, Oviedo, FL (US)

(73) Assignee: Zeta Global Corp., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/162,308

(22) Filed: May 23, 2016

(65) Prior Publication Data

US 2016/0269879 A1    Sep. 15, 2016

Related U.S. Application Data

(63) Continuation of application No. 14/474,101, filed on Aug. 30, 2014, now Pat. No. 9,351,134.

(Continued)

(51) Int. Cl.
*H04M 1/66* (2006.01)
*H04W 4/14* (2009.01)
(Continued)

(52) U.S. Cl.
CPC .............. *H04W 4/14* (2013.01); *G06Q 10/10* (2013.01); *H04L 51/046* (2013.01); *H04L 51/14* (2013.01);
(Continued)

(58) Field of Classification Search
None
See application file for complete search history.

(56) References Cited

U.S. PATENT DOCUMENTS 8,364,180 B2    1/2013  Harris et al.
2005/0164721 A1  7/2005  Eric Yeh et al.
(Continued)

FOREIGN PATENT DOCUMENTS

EP    1361763 A1    11/2003
WO    WO-0215603 A2   2/2002
(Continued)

OTHER PUBLICATIONS

"U.S. Appl. No. 14/474,101, Non Final Office Action mailed Jul. 2, 2015", 14 pgs.

(Continued)

*Primary Examiner* — Adolf Dsouza
(74) *Attorney, Agent, or Firm* — Schwegman Lundberg & Woessner, P.A.

(57) ABSTRACT

A system comprising a computer-readable storage medium storing at least one program and a computer-implemented method that enables short message service (SMS) text messaging to be integrated into existing applications is presented. Consistent with some embodiments, the method may include receiving a request from a client application to transmit a message to a recipient device. The method may further include validating the request to ensure that the telephone number is valid and that the message conforms to a predefined messaging standard. In response to successfully validating the request, the method causes transmission of the message to the recipient device.

21 Claims, 9 Drawing Sheets

Related U.S. Application Data

(60) Provisional application No. 61/874,864, filed on Sep. 6, 2013, provisional application No. 61/982,156, filed on Apr. 21, 2014.

(51) Int. Cl.

| | | |
|---|---|---|
| *H04W 12/06* | (2009.01) | |
| *G06Q 10/10* | (2012.01) | |
| *H04L 12/58* | (2006.01) | |
| *H04L 29/08* | (2006.01) | |
| *H04M 1/725* | (2006.01) | |

(52) U.S. Cl.
CPC .............. *H04L 51/30* (2013.01); *H04L 67/02* (2013.01); *H04M 1/72552* (2013.01); *H04W 12/06* (2013.01)

(56) References Cited

U.S. PATENT DOCUMENTS

| | | |
|---|---|---|
| 2007/0088851 A1 | 4/2007 | Levkovitz et al. |
| 2008/0084975 A1 | 4/2008 | Schwartz |
| 2009/0061943 A1 | 3/2009 | Kamgaing-kouam |
| 2010/0174813 A1 | 7/2010 | Hildreth et al. |
| 2013/0128882 A1* | 5/2013 | Lawson .............. H04M 7/0021 370/352 |
| 2015/0072651 A1 | 3/2015 | Ruttenbur |

FOREIGN PATENT DOCUMENTS

| | | |
|---|---|---|
| WO | WO-2011011835 A1 | 2/2011 |
| WO | WO-2015035208 A1 | 3/2015 |

OTHER PUBLICATIONS

"U.S. Appl. No. 14/474,101, Notice of Allowance mailed Jan. 25, 2016", 10 pgs.

"U.S. Appl. No. 14/474,101, Response filed Nov. 30, 2015 to Non Final Office Action mailed Jul. 2, 2015", 18 pgs.

"European Application Serial No. 14841759.5, Communication Pursuant to Article 94(3) EPC mailed Sep. 6, 2016", 7 pgs.

"European Application Serial No. 14841759.5, Extended European Search Report mailed Aug. 22, 2016", 4 pgs.

"International Application Serial No. PCT/US2014/054348, International Preliminary Report on Patentability mailed Mar. 17, 2016", 8 pgs.

"International Application Serial No. PCT/US2014/054348, International Search Report mailed Nov. 24, 2014", 2 pgs.

"International Application Serial No. PCT/US2014/054348, Written Opinion mailed Nov. 24, 2014", 6 pgs.

"U.S. Appl. No. 14/474,101, Examiner Interview Summary mailed Jan. 25, 2016", 2 pgs.

"European Application Serial No. 14841759.5, Response filed Jan. 5, 2017 to Communication Pursuant to Article 94(3) EPC mailed Sep. 6, 2016", 14 pgs.

* cited by examiner

MESSAGING SERVICE APPLICATION PROGRAMMING INTERFACE

PRIORITY

This patent application is a continuation of U.S. patent application Ser. No. 14/474,101, titled "MESSAGING SERVICE APPLICATION PROGRAMMING INTERFACE," filed Aug. 30, 2014, which claims the benefit of priority, to U.S. Provisional Patent Application Ser. No. 61/874,864, titled "SHORT MESSAGE SYSTEM APPLICATION PROGRAMMING INTERFACE," filed Sep. 6, 2013, and U.S. Provisional Patent Application Ser. No. 61/982,156, titled "SHORT MESSAGE SERVICE SUBSCRIPTION APPLICATION PROGRAMMING INTERFACE," filed Apr. 21, 2014, which are hereby incorporated by reference in their entirety.

TECHNICAL FIELD

This patent application relates to data processing. In particular, example embodiments may relate to an application programming interface for a messaging service.

BACKGROUND

A web service s a software system designed to support interoperable machine-to-machine interactions over a network. For example, web services may be deployed over the Internet or an intranet to create products, business processes, or business-to-business interactions. Web services often use standard Internet protocols (e.g., HTTP, XML, and SOAP) along with one or more web application programming interfaces (API) to enable such interoperability.

Short Message Service (SMS) is a text messaging paradigm employed by many current telephone, Internet, and mobile communication systems SMS utilizes a set of standardized communication protocols to enable users to exchange text message via fixed line or mobile phones.

BRIEF DESCRIPTION OF THE DRAWINGS

Various ones of the appended drawings merely illustrate example embodiments of the present invention and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve a system that enables developers and other clients to integrate short message service (SMS) text messaging into existing applications. The system may include an API to receive messaging requests from client applications, which in turn, triggers text messages sent in real-time to customers. Example messages may include order confirmations, shipment notifications, alerts, and other status messages. The system may further generate and maintain logs of received requests for subsequent reporting to clients.

Example embodiments may involve validating requests to ensure that messages are sent to valid telephone numbers. Messages may be analyzed to verify that they conform to predefined messaging standards. For example, content of messages may be filtered to ensure that they do not contain profanity.

In some instances, customers may be required to be subscribed (also referred to as "opted in") to programs prior to receiving messages. To this end, example embodiments may include an interface to opt-in customers to mobile alerts from hosted applications and receive a real-time SMS response. Examples of hosted applications included web forms, mobile applications (e.g., Android®, iOS®, Windows Phone® applications), and point of sale applications.

Example embodiments may provide support for the following features: opting customers in or out of mobile alerts; maintaining a record of customer attributes; management of multiple lists or brands (e.g., customers can be opted in or out of multiple messaging campaigns; tracking the source of an opt-in (e.g., web form); ensuring telephone numbers are valid; carrier verification; real-time SMS response; follow-up SMS responses (e.g., offers/coupons); double opt-in; duplicate rejection support (e.g., DOS prevention); and in-depth reporting including traffic, customer, carrier, keyword, geographic, and opt in data.

Figure 1:
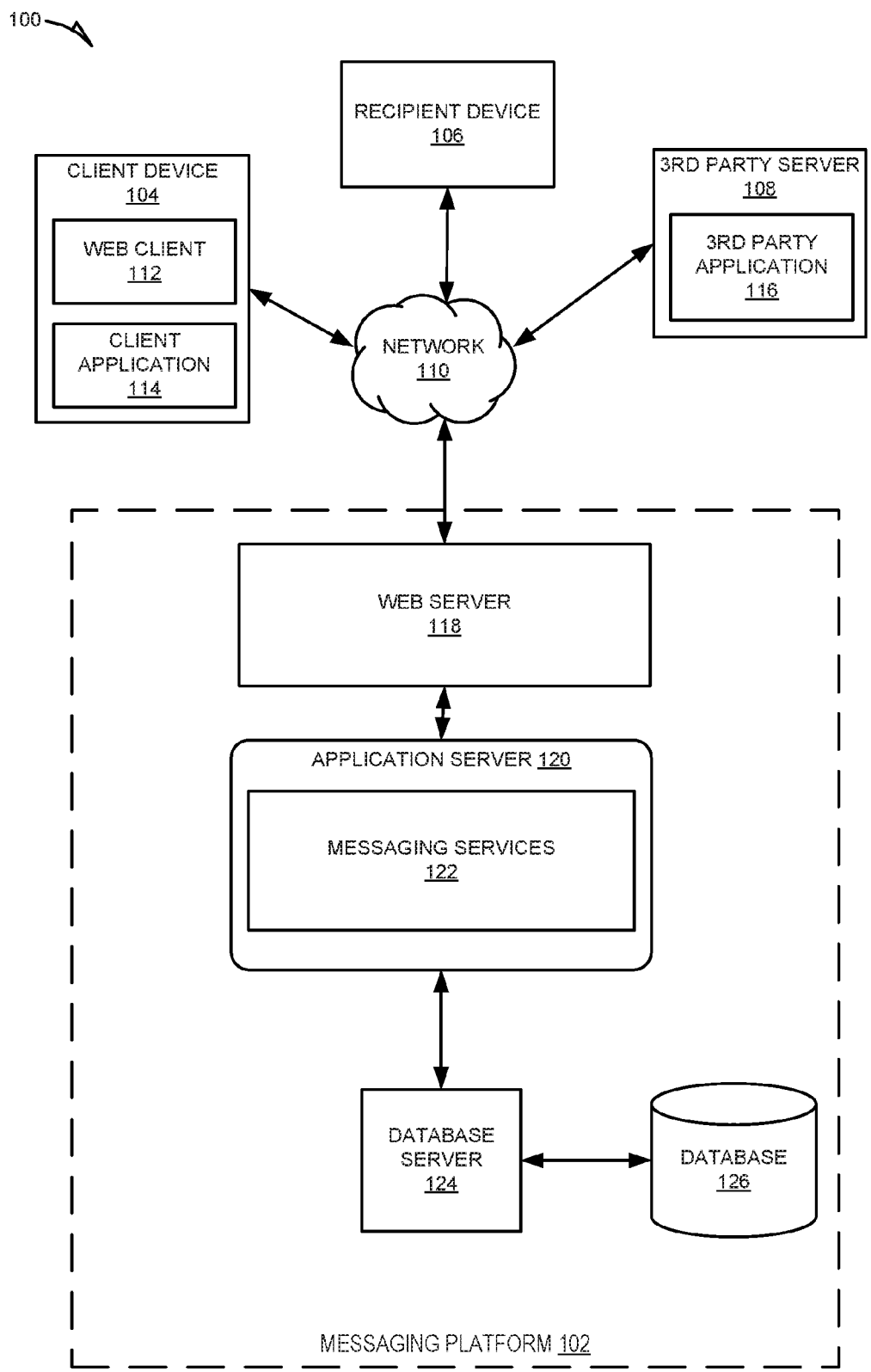
FIG. 1 is a network diagram depicting a network system having a client-server architecture configured for exchanging data over a network, according to an example embodiment.

FIG. 1 is a network diagram depicting a network system 100, according to one embodiment, having a client-server architecture configured for exchanging data over a network. While the network system 100 is illustrated as employing a client-server architecture, the present inventive subject matter is, of course, not limited to such an architecture, and could equally well find application in an event-driven, distributed, or peer-to-peer architecture system, for example. It shall be appreciated that although the various functional components of the network system 100 are discussed in the singular sense, multiple instances of one or more of the various functional components may be employed.

The network system 100 may include a messaging platform 102 in communication with a client device 104, a recipient device 106, and a third party server 108. The messaging platform 102 may communicate and exchange data within the network system 100 that may pertain to various functions and aspects associated with the network system 100 and its users. The messaging platform 102 may provide server-side functionality, via a network 110 (e.g., the Internet), to network devices such as, for example, the client device 104 and recipient device 106. The client device 104 may be a server residing on a client network or may be a device operated by clients who use the network system 100 to exchange data over the network 110. For purposes of this disclosure, a "client" refers to any person, entity, or organization that utilizes the services of the messaging platform 102, which in some embodiments, necessitates payment of a fee, to send messages to customers.

In various embodiments, the data exchanged within the network system 100 may be dependent upon user-selected functions available through one or more client or user interfaces (UIs). For example, the UIs may be associated with a client device, such as the client device 104 executing a web client 112 (e.g., an Internet browser) for communicating with the messaging platform 102. The UIs may also be associated with one or more applications executing on the client device 104, such as a client application 114.

The client device 104 may interface via a connection with the network 110 (e.g., the Internet or a wide area network (WAN)). Depending on the form of the client device 104, any of a variety of types of connections and networks 110 may be used. For example, the connection to the network 110 may be Code Division Multiple Access (CDMA) connection, a Global System for Mobile communications (GSM) connection, or other type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 110 may include a cellular network that has a plurality of cell sites of overlapping geographic coverage, interconnected by cellular telephone exchanges. These cellular telephone exchanges may be coupled to a network backbone (e.g., the public switched telephone networks (PSTN), a packet-switched data network, or other types of networks).

In another example, the connection to the network 110 may be Wireless Fidelity (e.g., Wi-Fi, IEEE 802.11x type) connection, a Worldwide Interoperability for Microwave Access (WiMAX) connection, or another type of wireless data connection. In such an embodiment, the network 110 may include one or more wireless access points coupled to a local area network (LAN), a WAN, the Internet, or other packet-switched data network. In yet another example, the connection to the network 110 may be a wired connection, for example an Ethernet link, and the network 110 may be a LAN, a WAN, the Internet, or other packet-switched data network. Accordingly, a variety of different configurations are expressly contemplated.

Turning specifically to the messaging platform 102, a web server 118 is coupled to, and provides the client device 104 with programmatic and web interfaces to an application server 120. As illustrated in FIG. 1, the application server 120 may be coupled via the web server 118 to the network 110, for example, via wired or wireless interfaces. In some embodiments, the web server 118 may employ security measures such as user authentication (e.g., requests include a username and password), IP whitelisting (e.g., clients may provide their public IP address to be granted access), and Secure Sockets Layer (SSL) (e.g., requests may use 128-bit SSL encryption).

The application server 120 may, for example, host one or more applications, which may provide a number of messaging services 122 to clients. The messaging services 122 may, for example, process messaging requests received from the client application 114. The messaging requests may be either message transmission requests or subscription requests. Upon processing a message transmission request, which specifies the recipient device 106 as the intended recipient of a message, the messaging platform 102 may cause a message (e.g., an SMS text message) to be transmitted to the recipient device 106. Upon processing a subscription request, which identifies the recipient device 106 as a target for a message subscription campaign of the client, the messaging platform 102 may cause a message to be transmitted to the recipient device 106 that seeks to opt-in a user of the recipient device 106 to the message subscription campaign. The processing of messaging requests may include authenticating the identity of a client associated with the request (e.g., the client who owns or operates the client application 114), performing various validations of the messaging request, and logging information related to the transmission of the message.

The application server 120 is also shown to be coupled to a database server 124 that facilitates access to a database 126. In some examples, the application server 120 can access the database 126 directly without the need for the database server 124. The database 126 may include multiple databases 128 that may be internal or external to the messaging platform 102.

The database 126 may store data pertaining to various functions and aspects associated with the network system 100 and its users. For example, the database 126 may store traffic data (e.g., a record of all incoming messaging requests and outgoing messages), carrier data e.g., telephone carriers of users), keyword data, geographic data, opt-out data, and customer data. The customer data may, for example, include demographic data, user interests and preferences, and financial information. The demographic data may, for example, include information describing one or more characteristics of a user such as gender, age, location information (e.g., hometown or current location), employment history, education history, contact information, familial relations, or user interests.

FIG. 1 also illustrates a third party application 116 executing on the third party server 108 that may offer one or more services to the messaging platform 102. The third party application 116 may have programmatic access to the messaging platform 102 via a programmatic interface provided by the web server 118, and the messaging platform 102 may in turn have programmatic access to the third party application 116 via an API provided by the third party server 108. In some embodiments, the third party application 116 may correspond to an SMS aggregator. An "SMS aggregator" refers to an entity that enables connectivity with telephone carriers by providing a gateway for sending and receiving messages and other content. In some embodiments, an SMS aggregator is responsible for routing messages to a telephone carrier (e.g., AT&T®, Verizon®, or T-Mobile®), who may in turn route messages to the recipient device 106. A "telephone carrier" (also known to those skilled in the art as a "telephone service provider," a "telecommunications operator," or a "telco") refers to an entity that provides telecommunications services such as telephony and data communications access.

Figure 2:
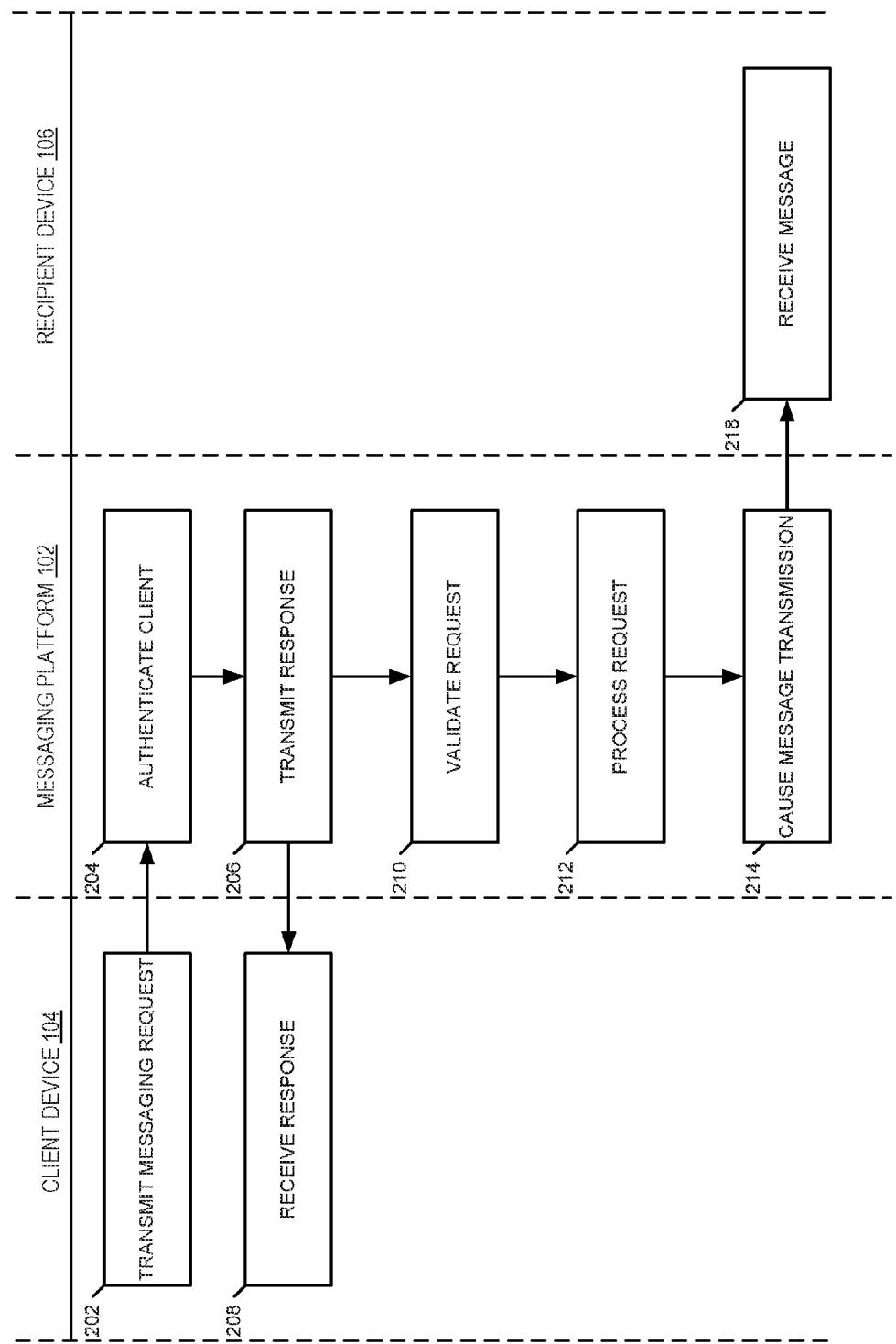
FIG. 2 is an interaction diagram depicting example exchanges between a client device, a messaging platform, and a recipient device, consistent with some embodiments.

FIG. 2 is an interaction diagram depicting example exchanges between a client device 104, a messaging platform 102, and a recipient device 106, consistent with some embodiments. As shown, the process begins at operation 202 where the client application 114 executing on the client device 104 transmits a messaging request to the messaging platform 102. The messaging request may, for example, be a hypertext transfer protocol (HTTP) request, and the request may be transmitted via a RESTful hypertext transfer protocol secure (HTTPS) interface that supports POST requests.

The transmission of the request may be triggered by an event occurring within the client device 104 or an external event that is detected by the client device 104 (e.g., by way of a communicative coupling to the third party server 108). For example, the detection of a package being successfully delivered may trigger the transmission of a messaging request for the transmission of a delivery confirmation. The messaging request may be either a message transmission request, which is a request that a certain message (e.g., text based message) be transmitted to a particular recipient, or a subscription request, which is a request that an opt-in message be sent to a particular recipient for the purpose of confirming the recipients' subscription to receive future messages sent on behalf of a client associated with the client application 114.

The messaging request may comprise a plurality of parameters that vary depending on whether the messaging request is a subscription request or a message transmission request. For example, the parameters of a subscription request may include a recipient telephone number, a list identifier (e.g., if a client has multiple messaging lists), an opt value (e.g., to indicate if the recipient has opted "in" or "out"), a recipient email address, recipient name (e.g., first and last name), date of birth of recipient, gender of recipient, and address (e.g., street, city, state, and zip). The parameters of a message transmission request may, for example, include recipient telephone number, a message (e.g., a text message to be sent to the recipient), an opt value (e.g., to indicate if the recipient has opted "in" or "out"), a recipient email address, recipient name (e.g., first and last name), date of birth of recipient, gender of recipient, and address (e.g., street, city, state, and zip). The parameters may be URL-encoded or provided as an extensible markup language (XML) payload via a POST parameter.

Upon receiving the messaging request, the messaging platform 102 may, at operation 204, authenticate a client (e.g., a user) associated with the client application 114 from which the messaging request was received. The authentication of the client may include verifying a username and password combination associated with the client. The authentication may further include verifying that the internet protocol (IP) address of the client device 104 corresponds to a record of the client's associated IP addresses maintained on the web server 118.

At operation 206, the messaging platform 102 transmits a response to the client device 104 confirming receipt of the request. The response may be an XML HTTP response that includes a status code. The status code provides an indication of the status of the request. For example, the status code may indicate that the request is accepted, that the request could not be understood due to bad syntax, that the client was not authorized, that a uniform resource identifier (URI) was not found, or that an unexpected internal error occurred. At operation 208 the client device 104 receives the response.

At operation 210, the messaging platform 102 validates the messaging request. The validation of the messaging request may include verifying that a telephone number included in the request is a valid telephone number (e.g., 11-digits for US-based telephone numbers), verifying a telephone carrier associated with the telephone number, verifying that the recipient has provided approval for receiving messages sent on behalf of the client (e.g., based on the recipient having previously opted-in), validating the requesting client, validating a list identifier, and verifying that a message included in a message transmission request conforms to a predefined messaging standard (e.g., verifying the message does not contain profanity).

Upon successful validation of the messaging request, the messaging platform 102 processes the request at operation 212, and causes a message (e.g., an SMS message) to be transmitted to the recipient device 106 to which the telephone number included in the messaging request is assigned, at operation 214. In other embodiments, the messaging platform 102 may cause the message to be transmitted to the recipient device 106 by transmitting a request that includes the telephone number, an identified telephone carrier, and the message to an SMS aggregator (e.g., hosted by the third party server 108). In turn, the SMS aggregator may route the message to the identified telephone carrier responsible for delivering the message to the recipient device 106. At operation 218, the recipient device 106 receives the message (e.g., as an SMS message).

Figure 3:
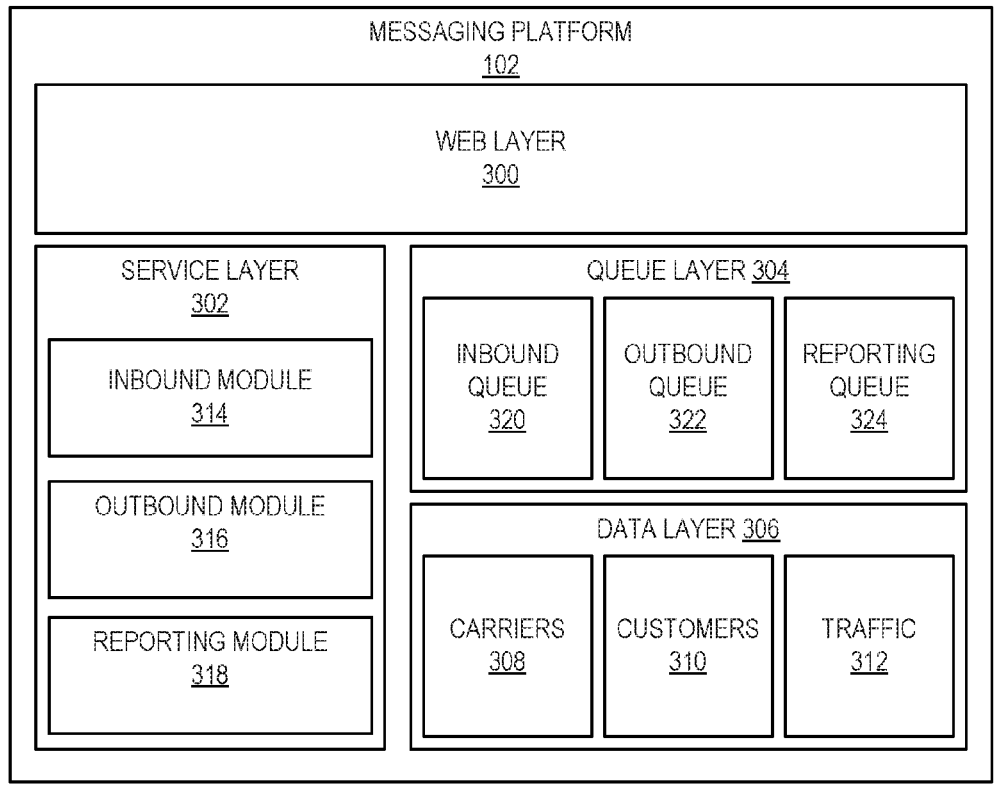
FIG. 3 is an architecture diagram illustrating various functional components of the messaging platform, which is provided as part of the network system, consistent with some embodiments.

FIG. 3 is an architecture diagram illustrating various functional components of the messaging platform 102, consistent with some embodiments. While the various components of the messaging platform 102 are discussed in the singular sense, it will be appreciated that in other embodiments multiple instances of any one of the components may be employed. As shown, the messaging platform 102 is comprised of a web layer 300, a service layer 302, a queue layer 304, and data layer 306. The various layers comprising the messaging platform 102 may be configured to communicate with each other, for example, via a bus, shared memory, a switch, or APIs.

The web layer 300 is responsible for providing interfaces to interact with users, and may, in some embodiments, correspond to the web server 118. The web layer 300 receives requests from external systems (e.g., client device 104) and places them into an inbound queue 320 of the queue layer 304. The service layer 302 resides on the application server 120 and interacts with the queue layer 304 and data layer 306 to perform functions such as sending messages and reporting. The service layer 302 may correspond to the messaging services 122 discussed in reference to FIG. 1, consistent with some embodiments. The queue layer 304 provides a temporary first in, first out holding area for items to be processed. The queue layer 304 may reside on the application server 120 or the database 126. The data layer 306, which resides on the database 126, stores information pertinent to carriers 308 (e.g., AT&T®, Verizon®, or T-Mobile®) and short codes, customers 310 (e.g., recipients of messages, and traffic 312 (e.g., messaging requests received, and messages transmitted).

The service layer 302 comprises an inbound module 314, an outbound module 316, and a reporting module 318. The inbound module 314 is responsible for processing messaging requests. The inbound module 314 may validate and verify various aspects of messaging requests, and if a request successfully passes these validations and verifications, the inbound module 314 places the request in an outbound queue 322 of the queue layer 304 for the outbound module 316 to process. If a request fails one of these validations or verifications, the inbound module 314 places the request in a reporting queue 324 for the reporting module 318 to process.

The outbound module 316 is responsible for transmitting messages (e.g., SMS text messages) to recipients. The outbound module 316 accesses requests from the outbound queue 322, and utilizes a direct-to-mobile gateway to transmit an SMS text message directly to a recipient device 106 associated with a telephone number specified in a messaging request, consistent with some embodiments. In other embodiments, the outbound module 316 may transmit a request to an SMS aggregator that routes the message to the applicable telephone carrier, who is ultimately responsible for delivering the message in SMS text message format to the recipient device 106. If the message is successfully transmitted, the outbound module 316 places the messaging request in the reporting queue 324 for reporting by the reporting module 318. If the message transmission is unsuccessful, the outbound module 316 adds the messaging request to an error log (e.g., maintained by the Windows Event Viewer).

The reporting module 318 is responsible for logging and storing pertinent information into the data layer 306 so that it may be viewed in a report provided to clients. The data stored by the reporting module 318 may, for example, include traffic, customer, carrier, keyword, geographic, and opt out data. If the reporting module 318 is unsuccessful in writing to the data layer 306, an error is logged (e.g., in the Windows Event Viewer). The reporting module 318 may also communicate the stored data related to messaging requests to clients associated with such requests. The stored data may be communicated in a report that conveys information in a manner that is easily understood by a human user (e.g., using plain text, tables, charts, and graphs).

Figure 4:
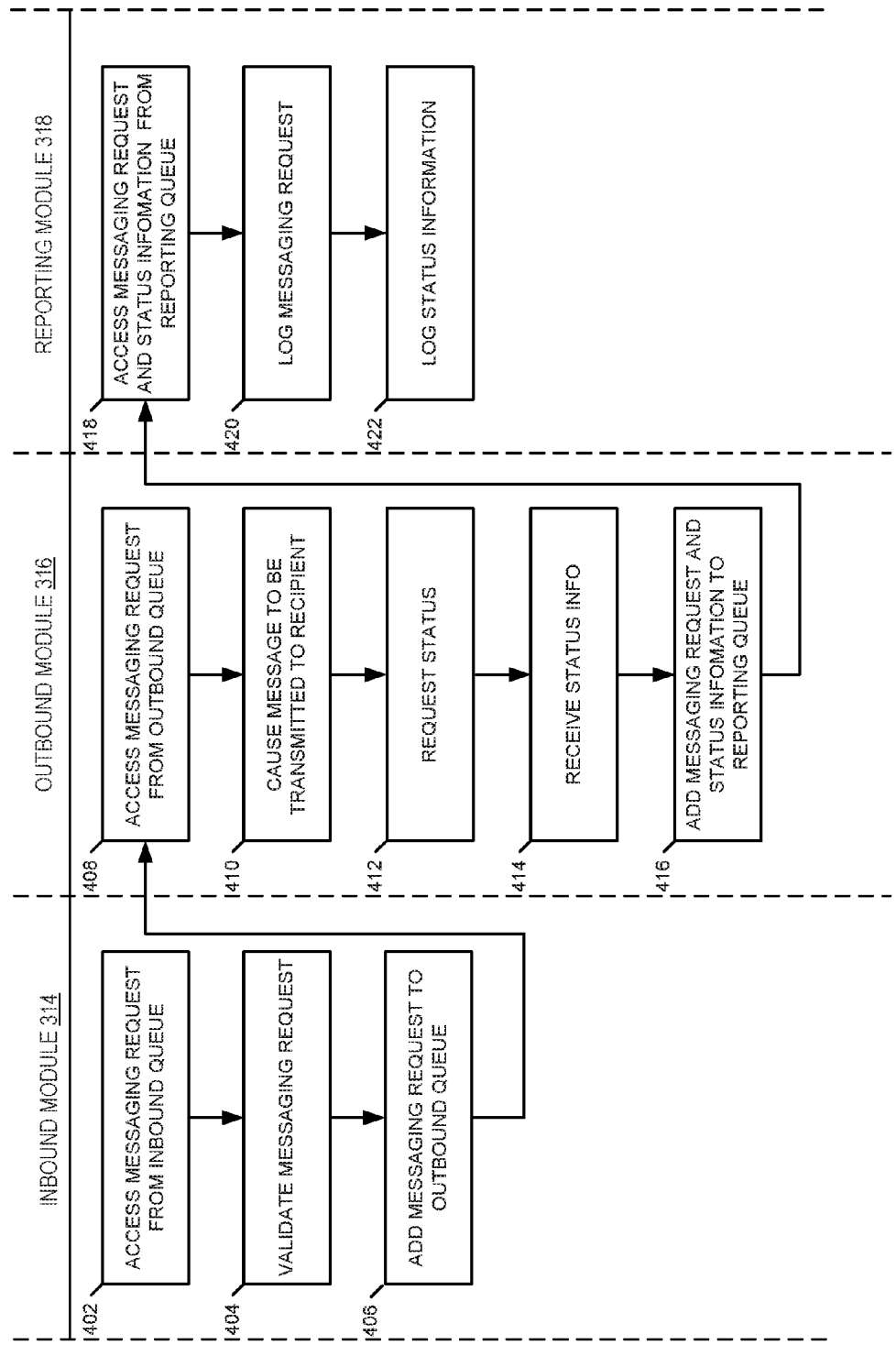
FIG. 4 is an interaction diagram illustrating example exchanges between an inbound module, an outbound module, and a reporting module, which are provided as part of the messaging platform, consistent with some embodiments.

FIG. 4 is an interaction diagram illustrating example exchanges between the inbound module 314, the outbound module 316, and the reporting module 318, consistent with some embodiments. As shown, the process begins at operation 402 where the inbound module 314 accesses a messaging request (e.g., a subscription request or a message transmission request) from the inbound queue 320. The messaging request includes a plurality of parameters including a telephone number (e.g., associated with the recipient device 106) specified as the recipient of a message (e.g., a message defined by the client or an opt-in message). At operation 404, the inbound module 314 validates the messaging request. For example, the inbound module 314 may verify that a telephone number included in the messaging request is a valid telephone number. In instances in which the messaging request is a message transmission request, the inbound module 314 may verify that a message included in the request conforms to a predefined messaging standard. In these instances, the inbound module 314 may further verify that the recipient has provided approval (e.g., opted-in) to receiving messages from the client. In instances in which the messaging request is a subscription request, the inbound module 314 may validate the client making the request and verify that a list identifier included in the request is valid.

Upon successfully validating the messaging request, the inbound module 314 adds the messaging request to the outbound queue 322, at operation 406.

At operation 408, the outbound module 316 accesses the messaging request from the outbound queue 322. At operation 410, the outbound module 316 causes a message (e.g., a message defined by the client or an opt-in message) to be transmitted to the recipient device 106. For example, the outbound module 316 may transmit a request to an SMS aggregator, which routes the message to a telephone carrier that ultimately delivers the message to the recipient device 106. At operation 412, the outbound module 316 requests the status of the message transmission (e.g., from the SMS aggregator). At operation 414, the outbound module 316 receives a response including status information (e.g., from the SMS aggregator) specifying the status of the message (e.g., successfully delivered). At operation 416, the outbound module 316 adds the messaging request and the status information to the reporting queue 324.

At operation 418, the reporting module 318 accesses the messaging request and status information from the reporting queue 324. At operation 420, the reporting module 318 logs the messaging request (e.g., stores a record of the messaging request in the database 126). At operation 422, the reporting module 318 logs the status information along with the messaging request (e.g., stores the status information along with the record of the messaging request).

Figure 5:
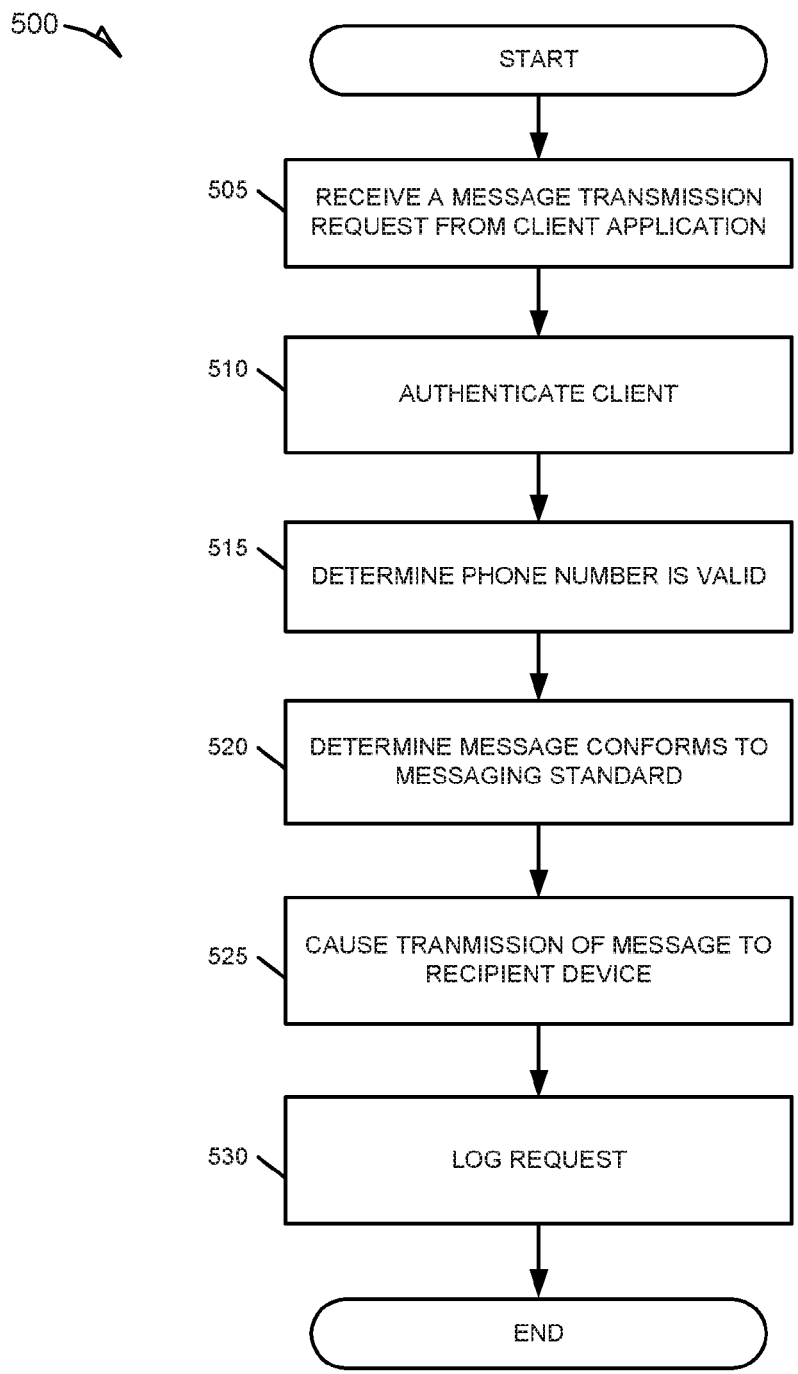
FIG. 5 is a flowchart illustrating a method for provisioning a client specified message to a recipient device in response to a request from a client application, consistent with some embodiments.

FIG. 5 is a flowchart illustrating a method 500 for provisioning a client specified message to the recipient device 106 in response to a request from a client application 114, consistent with some embodiments. The method 500 may be embodied in computer-readable instructions for execution by one or more processors such that the steps of the method 500 may be performed in part or in whole by the messaging platform 102. In particular, the method 500 may be carried out by the functional components forming the messaging platform 102, and accordingly, the method 500 is described below by way of example with reference thereto. However, it shall be appreciated that the method 500 may be deployed on various other hardware configurations and is not intended to be limited to the functional components of the messaging platform 102.

At operation 505, the web layer 300 receives a message transmission request from the client application 114 executing on the client device 104. The message transmission request is a request to transmit a particular message to a particular recipient. As such, the plurality of parameters comprising the message transmission request may include, at least, a telephone number and a message generated by a client associated with the client application 114. In an example, the message is an order confirmation to confirm a purchase made using the client application 114 that is in communication with a network-based marketplace, which in this example corresponds to the client.

At operation 510, the web layer 300 authenticates the client associated with the message transmission request (e.g., the client corresponding to the client application 114). In some embodiments, the authentication of the client may be based on username and password verification. In some embodiments, the authenticating of the client may include verifying that the IP address of the client device 104 corresponds to an address associated with the client by way of a record of associated IP addresses stored in the database 126.

Upon successfully authenticating the client, the inbound module 314 determines that the telephone number included as a parameter of the message transmission request is a valid telephone number in operation 515. The determination that the telephone number is valid may include verifying that the telephone number contains only digits, and that the telephone number contains an appropriate number of digits. The appropriate number of digits may vary by geographic region in which the messaging platform 102 is operating. For example, telephone numbers in the United States of America include either ten or eleven digits depending on whether a preceding "1" is included.

At operation 520, the inbound module 314 determines that the message generated by the client and included as a parameter of the message transmission request conforms to a predefined messaging standard. The predefined messaging standard may be generated by an administrator of the messaging platform 102 and may, for example, specify a certain format, a particular font, a word or character limit, or may prohibit the use of certain terms such as profanity. As such, the determination that the message conforms to the predefined messaging standard may include verifying that the message is in a certain format, verifying that the message uses a particular font, verifying that the message does not exceed a word or character limit, and verifying that the message does not include certain terms such as profanity.

In response to determining that the telephone number is valid, and that the message conforms to the predefined messaging standard, the outbound module 316 causes the transmission of the message to the recipient device 106, at operation 525. The recipient device 106 is the device assigned to the telephone number included as a parameter of the message transmission request. In some embodiments, the outbound module 316 may transmit the message directly to the recipient device 106 (e.g., in SMS text message format). In other embodiments, the outbound module 316 may forward the message to an intermediary entity such as an SMS aggregator that is responsible for routing the message to the appropriate telephone carrier that ultimately delivers the message in SMS text message format to the recipient device 106.

At operation 530, the reporting module 318 logs the message transmission request. The logging of the message transmission request may include storing a record of various data associated with the message transmission request in the database 126 (e.g., the data layer 306). For example, the reporting module 318 may store a record of the message transmission request (including the plurality of requests), a record of the telephone carrier associated with the telephone number, a record of the geographic region associated with the telephone number, and an indication of the successful transmission of the message.

Figure 6:
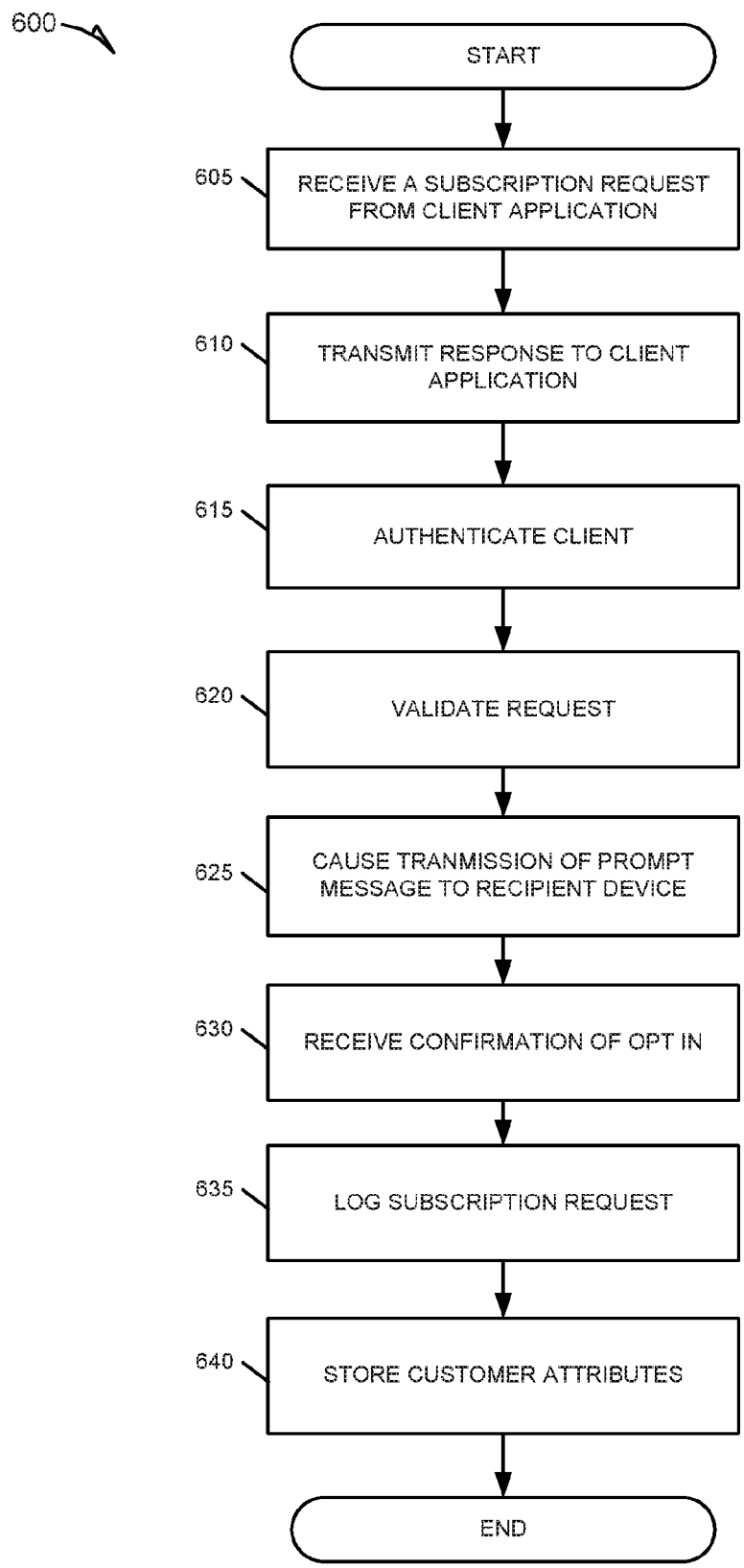
FIG. 6 is a flowchart illustrating a method for provisioning an opt-in message to a recipient device in response to a request from a client application, consistent with some embodiments.

FIG. 6 is a flowchart illustrating a method 600 for provisioning an opt-in message to a recipient device 106 in response to a request from a client application 114, consistent with some embodiments. The method 600 may be embodied in computer-readable instructions for execution by one or more processors such that the steps of the method 600 may be performed in part or ire whole by the messaging platform 102. In particular, the method 600 may be carried out by the functional components forming the messaging platform 102, and accordingly, the method 600 is described below by way of example with reference thereto. However, it shall be appreciated that the method 600 may be deployed on various other hardware configurations and is not intended to be limited to the functional components of the messaging platform 102.

At operation 605, the web layer 300 receives a subscription request from the client application 114. The subscription request is a request to transmit an opt-in message to a particular recipient for the purpose of opting the recipient into a messaging program whereby the recipient may routinely or occasionally receive messages sent on behalf of a client associated with the client application 114. As such, the plurality of parameters comprising the message transmission request may include, at least, a telephone number. At operation 610, the web layer 300 transmits a response to the client application 114 that includes a confirmation of successful receipt of subscription request.

At operation 615, the web layer 300 authenticates the client associated with the message transmission request (e.g., the client corresponding to the client application 114). In some embodiments, the authentication of the client may be based on username and password verification. In some embodiments, the authenticating of the client may include verifying that the IP address of the client device 104 corresponds to an IP address associated with the client by way of a record of associated IP addresses stored in the database 126.

Upon successfully authenticating the client, the inbound, module 314 validates the subscription request, at operation 620. The validation of the subscription request may include determining that the telephone number included as a parameter of the subscription request is a valid telephone number. The validation of the subscription request may further include verifying a telephone carrier associated with the telephone number. The validation of the subscription request may further include determining that a list identifier included as a parameter of the subscription request is valid. In some instances, clients may have multiple messaging lists to which a customer may subscribe. The multiple messaging lists may relate to various different aspects or topics associated with the client.

Upon successfully validating the request, the outbound module 316 causes the transmission of an opt-in message to the recipient device 106, at operation 625. The opt-in message may request approval from the user of the recipient device 106 (e.g., the recipient) for receiving future messages from the client. The recipient device 106 is the device to which the telephone number included as a parameter of the message transmission request is assigned. In some embodiments, the outbound module 316 may transmit the message directly to the recipient device 106. In other embodiments, the outbound module 316 may forward the message to an intermediary entity such as an SMS aggregator that is responsible for routing the message to the appropriate telephone carrier that ultimately delivers the message to the recipient device 106.

At operation 630, the web layer 300 receives a confirmation of an opt-in from the recipient device 106. The confirmation may be a reply message in the same format as the opt-in message (e.g., an SMS message). Upon receiving the confirmation, the reporting module 318 logs the subscription request at operation 635. The logging of the subscription request may include storing a record of various data associated with the subscription request in the database 126 (e.g., the data layer 306). For example, the reporting module 318 may store a record of the subscription request (including the plurality of requests), a record of the telephone carrier associated with the telephone number, a record of the geographic region associated with the telephone number, and an indication of the opt-in by the recipient. At operation 640, the reporting module 318 stores customer attributes in a customer profile maintained in the database 126.

Figure 7:
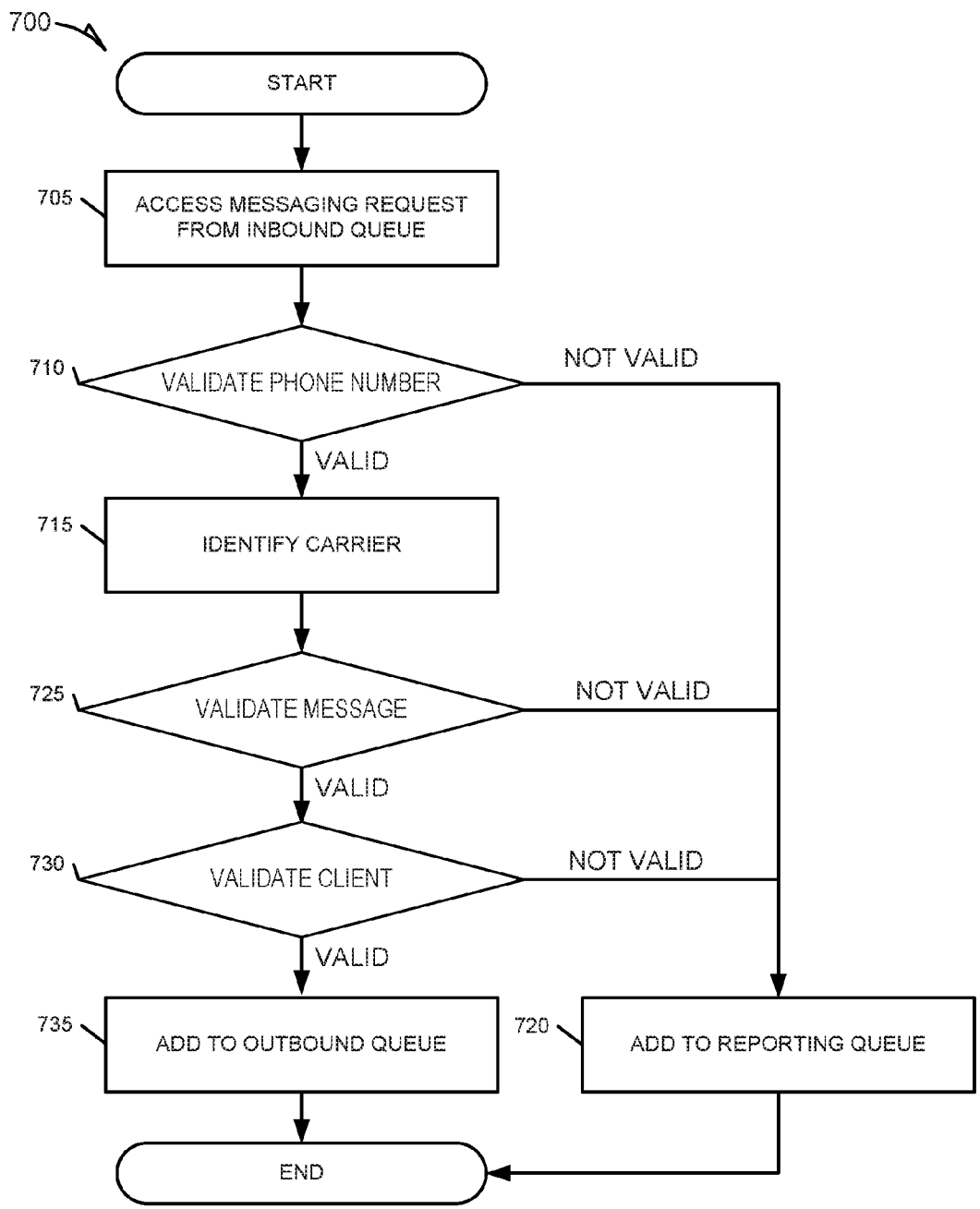
FIG. 7 is a flowchart illustrating a method for processing an inbound queue of messaging requests received from a client application, consistent with some embodiments.

FIG. 7 is a flowchart illustrating a method 700 for processing the inbound queue 320 of messaging requests received from the client application 114, consistent with some embodiments. The method 700 may be embodied in computer-readable instructions for execution by one or more processors such that the steps of the method 700 may be performed, in part or in whole, by the messaging platform 102. In particular, the method 700 may be carried out by the inbound module 314 of the messaging platform 102, and accordingly, the method 700 is described below by way of example with reference thereto. However, it shall be appreciated that the method 700 may be deployed on various other hardware configurations and is not intended to be limited to the inbound module 314.

At operation 705, the inbound module 314 accesses a messaging request (e.g., a message transmission request or a subscription request) from the inbound queue 320. At operation 710, the outbound module 316 performs a validation of the telephone number. If the telephone number is not valid, the inbound module 314 adds the messaging request to the reporting queue 324 for reporting by the reporting module 318, at operation 720. If the telephone number is valid (e.g., the telephone number has 11-digits), the inbound module 314 identifies the telephone carrier associated with telephone number at operation 715. The identification of the telephone carrier may include accessing a database 126 of telephone numbers with each telephone number included in the database 126 including an indication of a corresponding telephone carrier.

At operation 725, which may be performed only in embodiments in which the messaging request is a transmission request, the inbound module 314 validates a message included as a parameter of the messaging request. The validation of the message may include determining that the message conforms to a predefined messaging standard (e.g., specifying a certain format, a particular font, a word or character limit, or prohibiting the use of profanity). If the message is successfully validated, the inbound module 314 validates the client, at operation 730. The validation of the client may include verifying that the client has been approved to use the messaging platform 102. If the message is not successfully validated (e.g., the message contains profanity), the inbound module 314 adds the messaging request to the reporting queue 324 for reporting by the reporting module 318, at operation 720.

If the client is successfully validated, the inbound module 314 adds the messaging request to the outbound queue 322 (e.g., for processing by the outbound module 316), at operation 735. If the client is not successfully validated, the inbound module 314 adds the messaging request to the reporting queue 324 for reporting by the reporting module 318, at operation 720.

Figure 8:
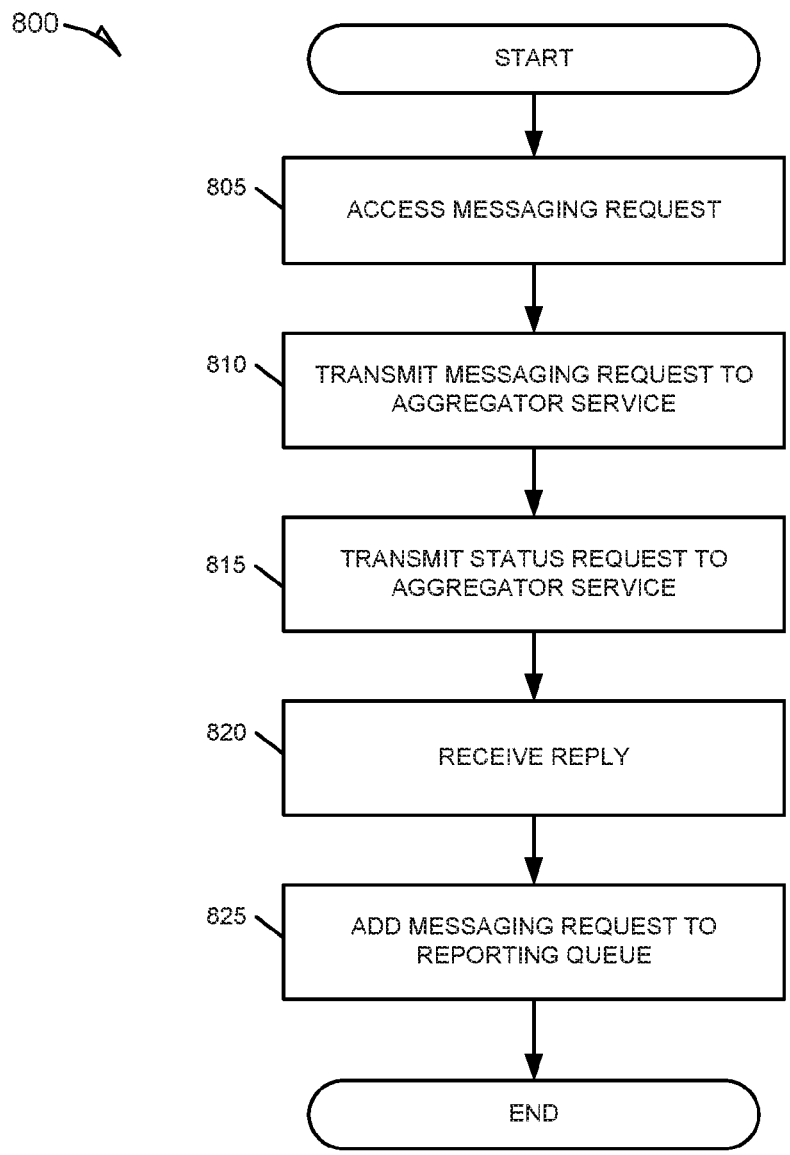
FIG. 8 is a flowchart illustrating a method for processing an outbound queue of messaging requests, consistent with some embodiments.

FIG. 8 is a flowchart illustrating a method for processing an outbound queue 322 of messaging requests, consistent with some embodiments. The method 800 may be embodied in computer-readable instructions for execution by one or more processors such that the steps of the method 800 may be performed in part or in whole by the messaging platform 102. In particular, the method 800 may be carried out by the outbound module 316 of the messaging platform 102, and accordingly, the method 800 is described below, by way of example with reference thereto. However, it shall be appreciated that the method 800 may be deployed on various other hardware configurations and is not intended to be limited to the outbound module 316.

At operation 805, the outbound module 316 accesses a messaging request (e.g., a message transmission request or a subscription request) from the outbound queue 322. At operation 810, the outbound module 316 transmits a request to an SMS aggregator to have a message (e.g., a message generated by the client or an opt-in message) sent to a telephone number specified in the messaging request. In this example embodiment, the SMS aggregator is responsible for the delivery of the message to the recipient device 106. At operation 815, the outbound queue 322 transmits a status request to the SMS aggregator to request the status of the message transmission. At operation 820, the outbound module 316 receives a reply, from the SMS aggregator, with the status of the message transmission (e.g., transmission pending, delivered, or error in transmission). At operation 825, the outbound module 316 adds the messaging request to the reporting queue 324 for reporting by the reporting module 318.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modulus). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 9:
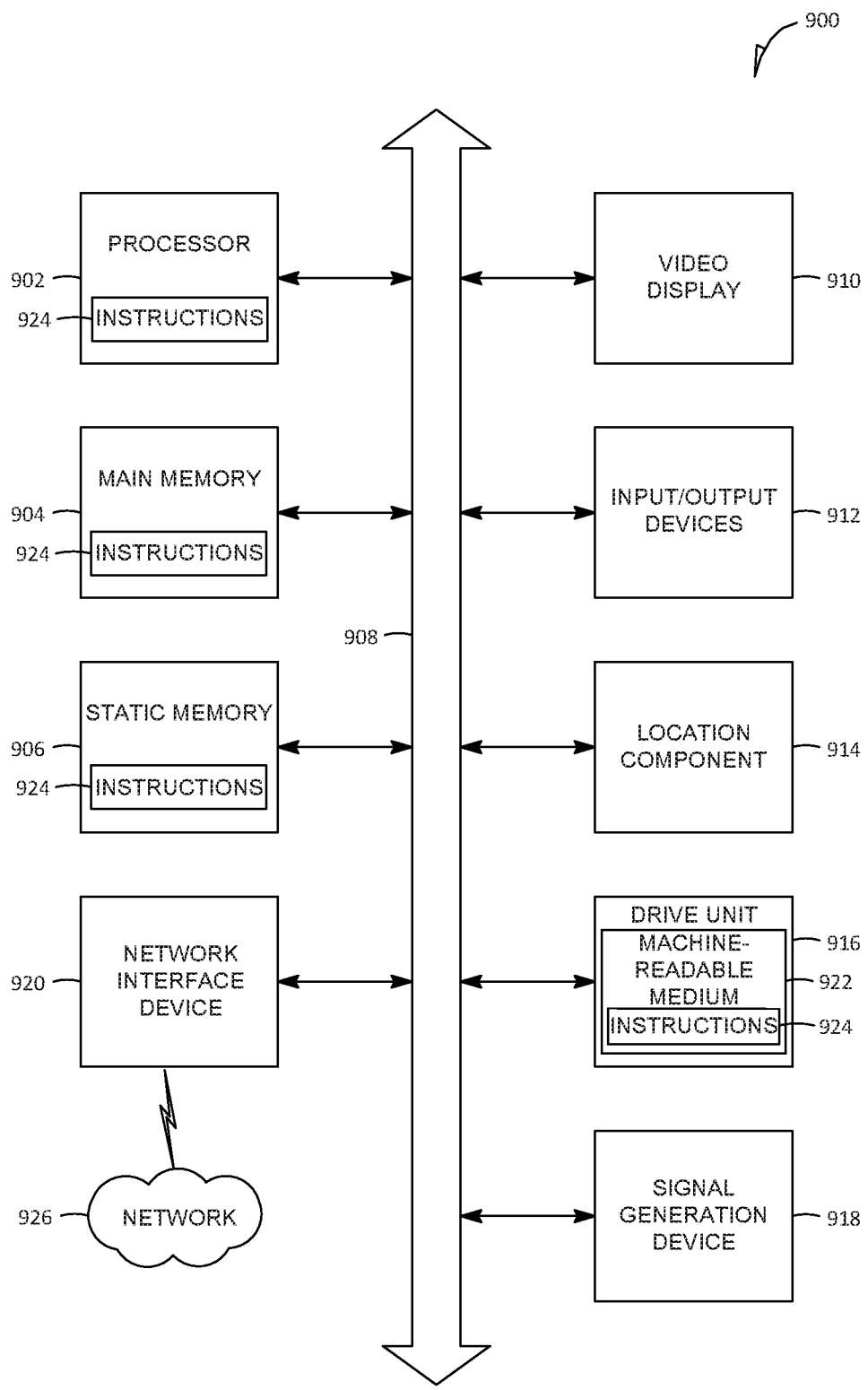
FIG. 9 is a diagrammatic representation of a machine in the example form of a computer system within which a set of instructions for causing the machine to perform any one or more of the methodologies discussed herein may be executed.

FIG. 9 is a diagrammatic representation of a machine in the example form of a computer system 900 within which a set of instructions for causing the machine to perform any one or more of the methodologies discussed herein may be executed. The computer system 900 may correspond to the client device 104, the recipient device 106, the third party server 108, or the application server 120, consistent with some embodiments. The computer system 900 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display 910 (e.g., a liquid crystal display (LCD) or a cathode ray tube (CRT)). The computer system 900 also includes one or more input/output (I/O) devices 912, a location component 914, a drive unit 916, a signal generation device 918 (e.g., a speaker), and a network interface device 920. The I/O devices 912 may, for example, include a keyboard, a mouse, a keypad, a multi-touch surface (e.g., a touchscreen or track pad), a microphone, a camera, and the like.

The location component 914 may be used for determining a location of the computer system 900. In some embodiments, the location component 914 may correspond to a GPS transceiver that may make use of the network interface device 920 to communicate GPS signals with a GPS satellite. The location component 914 may also be configured to determine a location of the computer system 900 by using an internet protocol (IP) address lookup or by triangulating a position based on nearby mobile communications towers. The location component 914 may be further configured to store a user-defined location in main memory 904 or static memory 906. In some embodiments, a mobile location enabled application may work in conjunction with the location component 914 and the network interface device 920 to transmit the location of the computer system 900 to an application server or third party server for the purpose of identifying the location of a user operating the computer system 900.

In some embodiments, the network interface device 920 may correspond to a transceiver and antenna. The transceiver may be configured to both transmit and receive cellular network signals, wireless data signals, or other types of signals via the antenna, depending on the nature of the computer system 900.

Machine-Readable Medium

The drive unit 916 includes a machine-readable medium 922 on which is stored one or more sets of data structures and instructions 924 (e.g., software) embodying or used by any one or more of the methodologies or functions described herein. The instructions 924 may also reside, completely or at least partially, within the main memory 904, the static memory 906, or within the processor 902 during execution thereof by the computer system 900, with the main memory 904, the static memory 906, and the processor 902 also constituting machine-readable media.

Consistent with some embodiments, the instructions 924 may relate to the operations of an operating system (OS). Depending on the particular type of the computer system 900, the OS may, for example, be the iOS® operating system, the Android® operating system, a BlackBerry® operating system, the Microsoft® Windows® Phone operating system, Symbian® OS, or webOS®. Further, the instructions 924 may relate to operations performed by applications (commonly known as "apps"), consistent with some embodiments. One example of such an application is a mobile browser application that displays content, such as a web page or a user interface using a browser.

While the machine-readable medium 922 is shown in an example embodiment to be a single medium, the term "machine-readable medium" may include a single medium or multiple media (e.g., a centralized or distributed database, and/or associated caches and servers) that store the one or more data structures or instructions 924. The term "machine-readable medium" shall also be taken to include any tangible medium that is capable of storing, encoding, or carrying instructions (e.g., instructions 924) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EE-PROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 924 may further be transmitted or received over a network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying the instructions 924 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually, or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more processors and executable instructions accessible on a computer-readable medium that, when executed, cause the one or more processors to perform operations comprising:
receiving, from a client application executing on a client device, a message transmission request including a telephone number assigned to a recipient device;
adding the message transmission request to an outbound queue based on determining the message transmission request is valid;
causing transmission of a message to the recipient device based on the message transmission request being included in the outbound queue;
obtaining status information specifying a status of transmission of the message, the status information including an indication of successful transmission of the message;
adding the message transmission request and the status information to a reporting queue; and
storing a record of the message transmission request, the record including the message and the indication of successful transmission of the message.

2. The system of claim 1, wherein the storing the record of the message transmission request comprises storing the record in a machine-readable medium responsive to the causing the transmission of the message.

3. The system of claim 1, wherein the causing transmission of the message comprises transmitting a request to a Short Message Service (SMS) aggregator, the request identifying the telephone number and a telephone carrier associated with the recipient device, the SMS aggregator to route the message to the telephone carrier.

4. The system of claim 1, wherein a predefined messaging standard specifies a particular format for the message.

5. The system of claim 1, wherein the message is transmitted as a Short Message Service (SMS) message.

6. The system of claim 1, wherein the message transmission request is a Hypertext Transfer Protocol (HTTP) request.

7. The system of claim 1, wherein the operations further comprise determining that the telephone number is valid by determining that the telephone number includes a particular number of digits.

8. A method comprising:
receiving, from a client application executing on a client device, a message transmission request including a telephone number assigned to a recipient device;
adding, by a machine having a memory and at least one processor, the message transmission request to an outbound queue based on determining the message transmission request is valid;
causing transmission of a message to the recipient device based on the message transmission request being included in the outbound queue;
obtaining status information specifying a status of transmission of the message, the status information including an indication of successful transmission of the message;
adding the message transmission request and the status information to a reporting queue; and
staring a record of the message transmission request, the record including the message and the dication of successful transmission of the message.

9. The method of claim 8, wherein the storing the record of the message transmission request comprises storing the record in a machine-readable medium responsive to the causing the transmission of the message.

10. The method of claim 8, further comprising determining that the telephone number is valid by determining that the telephone number includes a particular number of digits.

11. The method of claim 8, wherein the causing transmission of the message comprises transmitting a request to a Short Message Service (SMS) aggregator, the request identifying the telephone number and a telephone carrier associated with the recipient device, the SMS aggregator to route the message to the telephone carrier.

12. The method of claim 8, wherein a predefined messaging standard specifies a particular format for the message.

13. The method of claim 8, wherein the message is transmitted as a Short Message Service (SMS) message.

14. The method of claim 8, wherein the message transmission request is a Hypertext Transfer Protocol (HTTP) request.

15. A computer-readable hardware storage device having stored therein a set of program instructions which, when executed by the computer causes the computer to perform operations comprising:
receiving, from a client application executing on a client device, a message transmission request including a telephone number assigned to a recipient device;

adding the message transmission request to an outbound queue based on determining the message transmission request is valid;

causing transmission of a message to the recipient device based on the message transmission request being included in the outbound queue;

obtaining status information specifying a status of transmission of the message, the status information including an indication of successful transmission of the message;

adding the message transmission request and the status information to a reporting queue; and storing a record of the message transmission request, the record including the message and the indication of successful transmission of the message.

16. The computer-readable hardware storage device of claim 15, wherein the storing the record of the message transmission request comprises storing the record in a machine-readable medium responsive to the causing the transmission of the message.

17. The computer-readable hardware storage device of claim 15, wherein the operations further comprise determining that the telephone number is valid by determining that the telephone number includes a particular number of digits.

18. The computer-readable hardware storage device of claim 15, wherein the causing transmission of the message comprises transmitting a request to a Short Message Service (SMS) aggregator, the request identifying the telephone number and a telephone carrier associated with the recipient device, the SMS aggregator to route the message to the telephone carrier.

19. The computer-readable hardware storage device of claim 15, wherein a predefined messaging standard specifies a particular format for the message.

20. The computer-readable hardware storage device of claim 15, wherein the message is transmitted as a Short Message Service (SMS) message.

21. The computer-readable hardware storage device of claim 15, wherein the message transmission request is a Hypertext Transfer Protocol (HTTP) request.

* * * * *